(12) United States Patent
Lesage

(10) Patent No.: US 6,957,831 B1
(45) Date of Patent: Oct. 25, 2005

(54) NIPPLE FOR HOT WATER TANK CONDUITS

(75) Inventor: Claude Lesage, Pointe Claire (CA)

(73) Assignee: Giant Factories Inc., Montreal (CA)

( * ) Notice: Subject to any disclaimer, the term of this patent is extended or adjusted under 35 U.S.C. 154(b) by 0 days.

(21) Appl. No.: 10/736,497

(22) Filed: Dec. 17, 2003

(51) Int. Cl.[7] ............................ F16L 11/12; B65D 90/00
(52) U.S. Cl. ......................... 285/53; 285/215; 285/219; 220/567.3; 220/592.28
(58) Field of Search .......................... 285/53, 215, 216, 285/143.1, 219; 220/567.3, 592.28

(56) References Cited

U.S. PATENT DOCUMENTS

| | | | | |
|---|---|---|---|---|
| 1,872,702 A | * | 8/1932 | Duncklee | 285/39 |
| 2,006,139 A | * | 6/1935 | Arthur | 285/143.1 |
| 2,257,385 A | * | 9/1941 | Keegan | 122/13.01 |
| 2,353,477 A | * | 7/1944 | Koppel | 285/205 |
| 2,450,173 A | * | 9/1948 | Uhri | 285/204 |
| 2,459,123 A | * | 1/1949 | Bates et al. | 204/196.15 |
| 2,858,959 A | * | 11/1958 | Bixby | 220/62.15 |
| 4,306,189 A | * | 12/1981 | Nozaki | 324/425 |
| 4,619,374 A | * | 10/1986 | Yavorsky | 220/62.19 |
| 4,653,434 A | * | 3/1987 | Wilhelm, Jr. | 122/20 B |
| 4,660,594 A | * | 4/1987 | Gocze | 137/375 |
| 4,898,152 A | * | 2/1990 | Kahl | 126/586 |
| 4,964,394 A | * | 10/1990 | Threatt | 122/14.31 |
| 5,176,807 A | * | 1/1993 | Kumar | 204/196.06 |
| 6,129,121 A | * | 10/2000 | Kohle | 138/143 |

* cited by examiner

*Primary Examiner*—James M. Hewitt
(74) *Attorney, Agent, or Firm*—Ogilvy Renault; Guy J. Houle

(57) ABSTRACT

A nipple for connection to an outer metal casing of a host water heater for coupling a water conduit to an inner casing of the hot water heater is described. The nipple is a hollow tube having opposed threaded end portions. A thermally insulating sleeve is provided about the hollow tube intermediate the opposed threaded end portions. The nipple is adapted for connection in a hole formed in the outer metal casing with the thermally insulating sleeve in contact with a circumferential edge of the hole to insulate the metal casing from the nipple.

7 Claims, 2 Drawing Sheets

NIPPLE FOR HOT WATER TANK CONDUITS

TECHNICAL FIELD

The present invention relates to a nipple for connection to an outer metal casing of a hot water heater for coupling a water conduit to an inner casing of the hot water heater and wherein the nipple is substantially insulated from the outer metal casing.

BACKGROUND ART

The construction of a hot water heater consists essentially of an inner tank which constitutes a reservoir in which water is heated. The inner tank is insulated from an outer casing by spacing an outer casing from the inner tank and filling the interstices with an insulating foam or fibreglass material. The top of the tank is provided with conduits to admit water into the tank and to remove hot water from the tank. These conduits are usually interconnected to the cover of the outer casing through an interconnecting nipple and bushing. Usually, copper piping is connected to the outer end of the nipples. The nipples are secured to the top wall of the outer metal casing by metal bushings.

It has been found that an important amount of heat is lost through the outer casing top wall due to its contact with these nipples. The nipple is a metal tube which is highly thermally conductive as well as its couplings. Accordingly, heat exchange between the nipple is made with the top wall of the outer casing which is also constructed of metal. This heat is propagated throughout the top wall of the casing and into the other nipple and the tubes and the metal conduits secured thereto. Holes are presently punched in the top wall of the outer casing and are about 1316 inch less than the OD of the nipples. These holes are also not always concentric with the nipple OD.

There is a requirement to render hot water heaters thermally efficient and this is done by isolating the inner tank from the outer casing all about the tank. Such inner tanks, and the ones which are heated by electrical resistive heating elements, are mounted on foam bases whereby the tank is well isolated at the base and all around. However, in order to render the tank more efficient, we have discovered that there is a need to insulate these nipples to substantially reduce the heat loss which is transmitted through the top wall of the outer casing.

SUMMARY OF INVENTION

It is therefore a feature of the present invention to provide a nipple for connection to an outer metal casing of a hot water heater and which substantially overcomes the above-mentioned disadvantage of the prior art.

According to the above feature, from a broad aspect, the present invention provides a nipple for connection to an outer metal casing of a hot water heater for coupling a water conduit to an inner casing of the hot water heater. The nipple is a hollow tube having opposed threaded end portions. A thermally insulating sleeve is provided about the hollow tube intermediate the opposed threaded end portions. The nipple is adapted for connection in a hole formed in the outer metal casing with the thermally insulating sleeve in contact with a circumferential edge of the hole to insulate the metal casing from the nipple.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
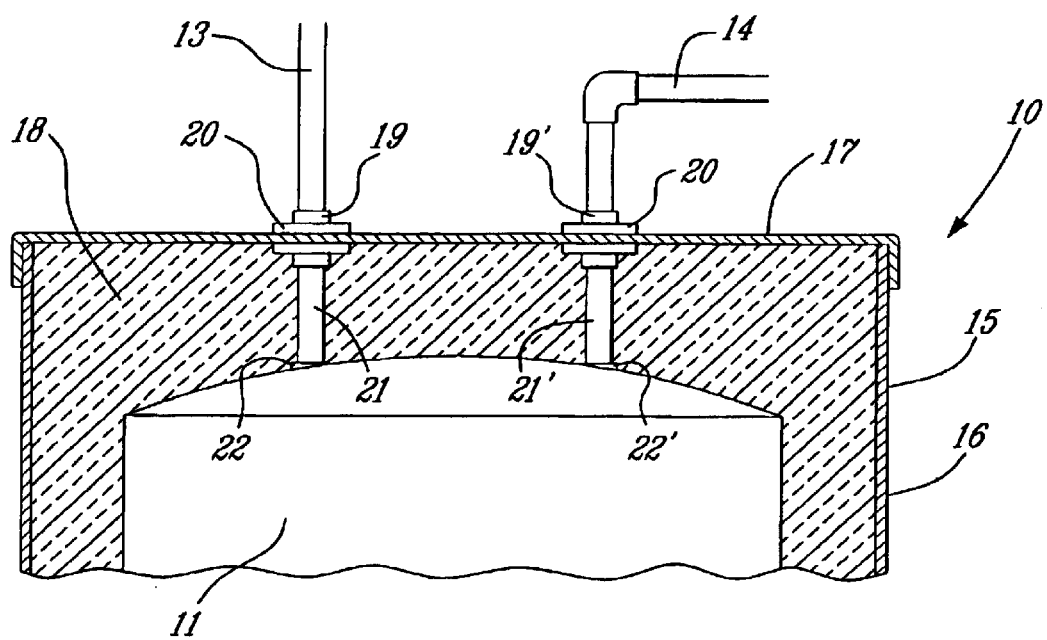
FIG. 1 is a partly fragmented top view of a hot water heater showing the connection of nipples in a top wall of an outer casing for connecting conduits to the inner tank of the hot water heater.

Referring now to the drawings, and more specifically to FIG. 1, there is shown generally at 10, a fragmented top section of a domestic hot water heater. Hot water heaters comprise an inner steel tank 11 in which water is supplied by an inlet conduit 13 and hot water is taken from the inner tank 11 through an outlet conduit 14. The inner tank 11 is surrounded by an outer casing 15 which usually comprises a cylindrical metal sleeve 16 and a top cover 17. The bottom of the tank is also insulated and sits on a dish which is secured to the cylindrical metal sleeve 16. Insulating wool or foam material 18 is placed or injected in the space between the outer casing and the inner tank whereby to insulate the hot inner tank which contains the hot water from the outer casing.

As herein shown, the inlet and outlet conduits 13 and 14 are connected to the inner tank through a metal nipple 19 and 19' which are usually secured to the top cover 17 or top wall by metal bushings 20. However, they could also be connected in a top region of the side wall 16. As previously described, a problem with these nipples and bushings is that they conduct heat, and accordingly, hot water leaving the hot water tank 10 through the outlet conduit 14 is absorbed in the top cover and this constitutes heat loss which translates in energy loss, resulting in an increase in the consumption of energy to heat the water within the inner tank.

Figure 2:
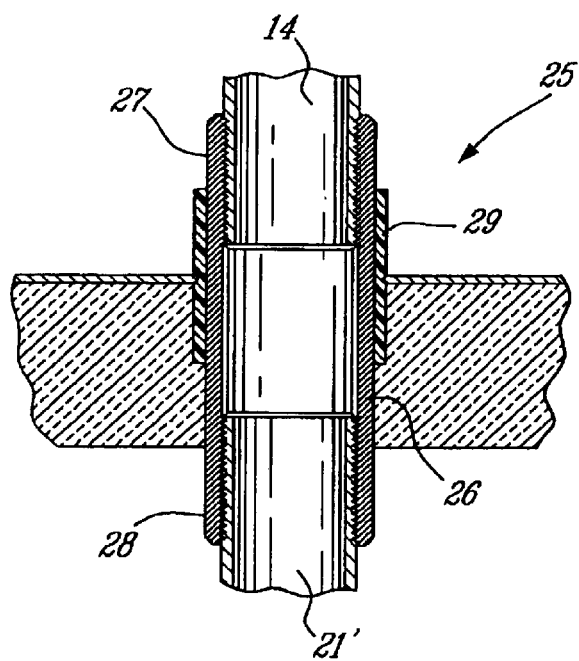
FIG. 2 is a fragmented section view showing one embodiment of the nipple constructed in accordance with the present invention.
Figure 3:
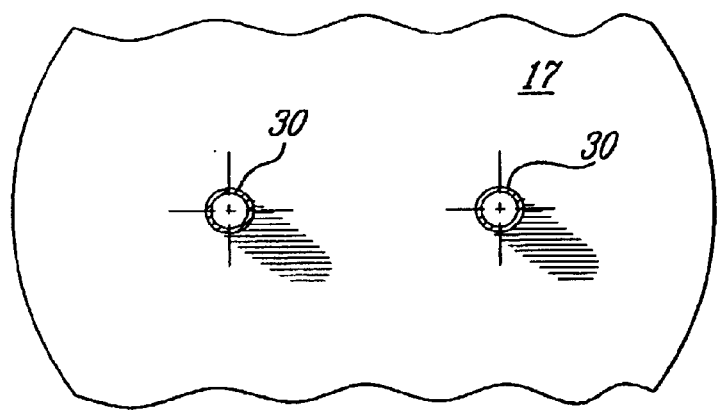
FIG. 3 is a top view of the top wall of the outer casing of a hot water heater.

With reference now to FIG. 2, there is shown the nipple 25 constructed in accordance with the present invention. The nipple is a hollow metal tube 26 provided with opposed threaded end portions, namely an outer threaded portion 27 and an inner threaded portion 28. The inlet and outlet conduits are connected to the outer threaded portion 27 whereas the inner threaded portion 2B is connected to interconnecting conduits 21 and 21' or directly to the inner tank 11 top wall through appropriate bushings 22 and 221. The hollow metal tube 26 of the nipple 25 is provided with a thermally insulating sleeve 29 thereabout and disposed intermediate the opposed threaded end portions 27 and 2B. As herein shown, the thermally insulating sleeve 29 is a plastic shroud which is secured to the hollow tube by heat shrink. It is also dimensioned for press-fit within the holes 30 provided in the top wall or top cover 17 of the outer casing of the hot water heater as shown in FIG. 3. Accordingly, the nipple 25 is insulated from the top wall whereby to substantially reduce heat loss between the nipple and the top wall 17.

Figure 4:
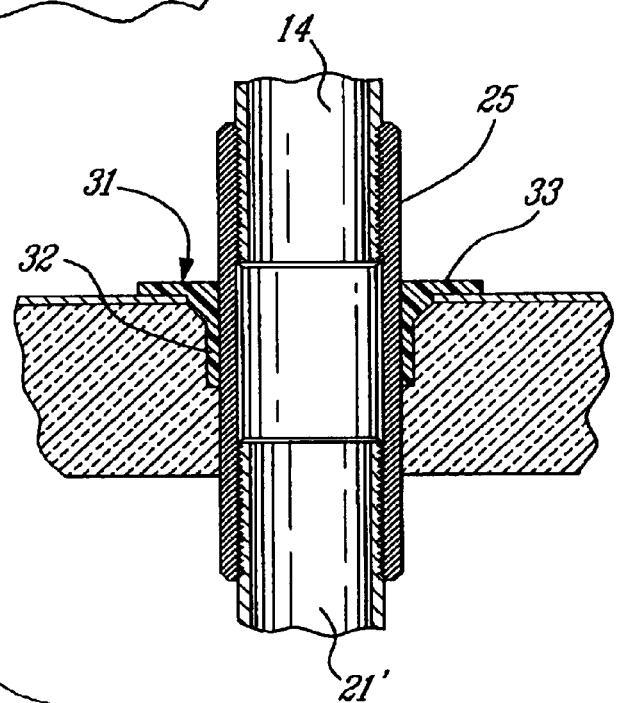
FIG. 4 is a fragmented section view similar to FIG. 2 but showing another embodiment of the nipple constructed in accordance with the present invention.
Figure 5:
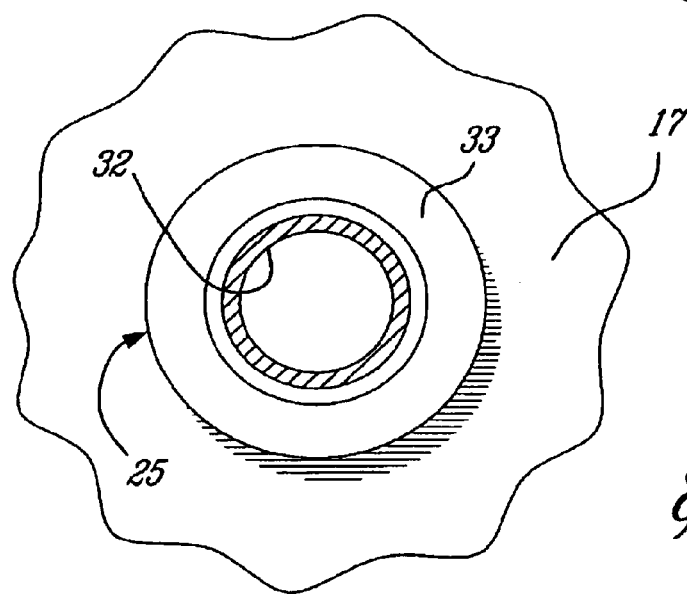
FIG. 5 is a top view of FIG. 4.

Referring now to FIG. 4, there is shown another embodiment of the thermally insulating sleeve and, as herein shown, the sleeve is provided as a polyethylene plastic coupling 31 which defines a tubular body portion 32 which is dimensioned for press-fit into the holes 30 made in the outer casing. A transverse circumferential flange 33 is formed integral with the tubular body portion 32 and overlies the top surface of the top cover 17 about the hole 30. The coupling 31 is also an injection moulded part which is press-fitted about the nipple 25.

It is within the ambit of the present invention to cover any obvious modifications of the examples of the preferred embodiment described herein, provided such modifications fall within the scope of the appended claims.

I claim:

1. A nipple for connection to an outer metal casing of a hot water heater for coupling a water conduit to an inner casing of said hot water heater, said nipple being a hollow tube having opposed threaded end portions, and a thermally insulating sleeve about said hollow tube intermediate said opposed threaded end portions, said nipple being adapted for connection in a hole formed in said outer metal casing with said thermally insulating sleeve in contact with a circumferential edge of said hole to insulate said metal casing from said nipple.

2. A nipple as claimed in claim 1 wherein said thermally insulating sleeve is a plastic shroud secured about said nipple.

3. A nipple as claimed in claim 1 wherein said thermally insulating sleeve is a plastic coupling.

4. A nipple as claimed in claim 3 wherein said coupling has a tubular body portion secured in press-fit about said hollow tube, and a transverse circumferential flange about a top end of said tubular body portion to overlie an outer surface of said outer metal casing about said hole.

5. A nipple as claimed in claim 4 wherein said plastic coupling is moulded from polyethylene plastic material.

6. A nipple as claimed in claim 2 wherein said plastic shroud is secured to said hollow tube by heat shrink.

7. A nipple as claimed in claim 1 wherein there are two of said nipples secured to a top wall of said outer metal casing, one of said nipples being connected to an inlet water conduit and the other to an outlet water conduit.

* * * * *